(No Model.) 4 Sheets—Sheet 1.
D. W. WEBSTER & R. J. SMITH.
BROADCAST SEEDER.
No. 335,661. Patented Feb. 9, 1886.
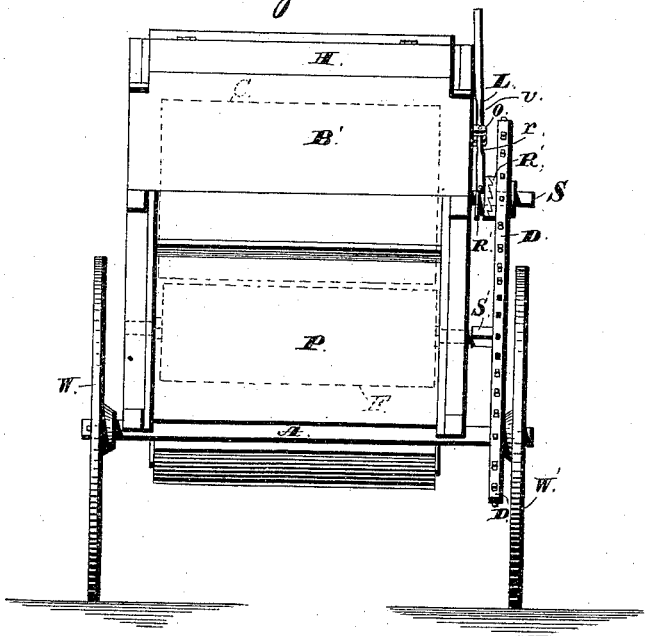
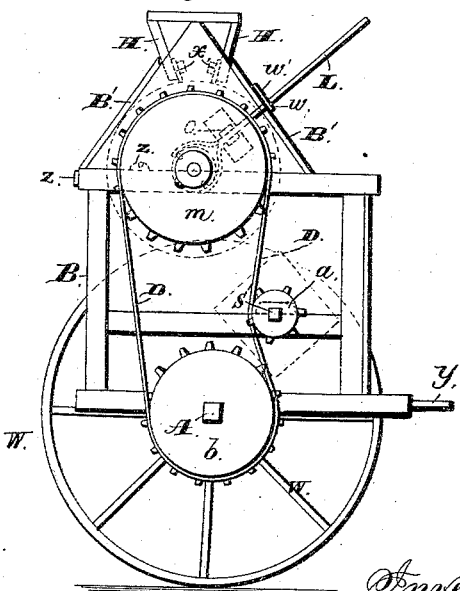
Witnesses:
Jas. E. Hutchinson.
W. H. Ridgway.
Inventors:
Daniel W. Webster and
Ruben J. Smith.
By Woodbury & White
Atty's (No Model.) 4 Sheets—Sheet 2.

D. W. WEBSTER & R. J. SMITH.
BROADCAST SEEDER.

No. 335,661. Patented Feb. 9, 1886.

Witnesses:
Jas. E. Hutchinson
W. H. Ridgway

Inventors,
Daniel W. Webster and
Ruben J. Smith
By Woodbury & White
Atty's (No Model.) 4 Sheets—Sheet 3.

D. W. WEBSTER & R. J. SMITH.
BROADCAST SEEDER.

No. 335,661. Patented Feb. 9, 1886.

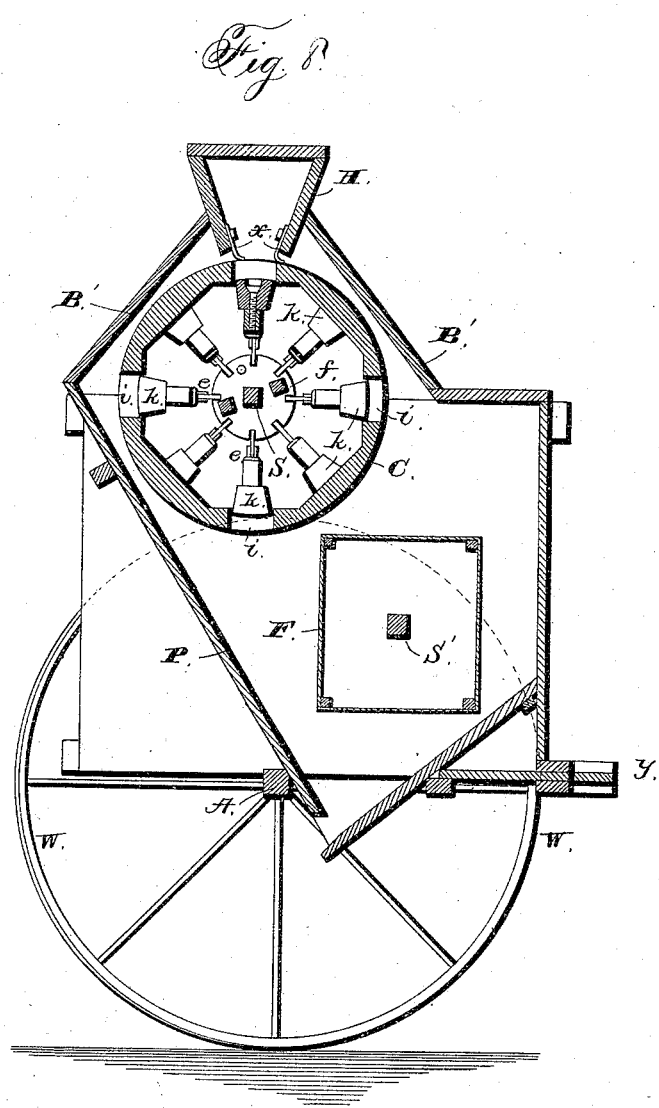

UNITED STATES PATENT OFFICE.

DANIEL W. WEBSTER AND RUBEN J. SMITH, OF OSCEOLA, IOWA.

BROADCAST SEEDER.

SPECIFICATION forming part of Letters Patent No. 335,661, dated February 9, 1886.

Application filed July 21, 1885. Serial No. 172,249. (No model.)

*To all whom it may concern:*

Be it known that we, DANIEL W. WEBSTER and RUBEN J. SMITH, of Osceola, in the county of Clarke and State of Iowa, have invented certain new and useful Improvements in Broadcast Seeders; and we do hereby declare that the following is a full, clear, and exact description thereof, reference being had to the accompanying drawings, and to the letters of reference marked thereon, making a part of this specification.

The nature of our invention consists in the construction and arrangement of a machine for sowing broadcast any kind of grain or seeds by means of a revolving cylinder provided with cups in the face thereof. These cups are filled from a hopper, the bottom of which is formed by the revolving cylinder. The lower edge of the hopper is provided with a rubber cut-off, to prevent any grain from leaving the hopper, except what is carried in the cups. The grain thus carried forward in the cups of the cylinder falls upon a revolving fan, which turns toward the cylinder, carrying the grain to an inclined plane whose width is the length of the cylinder. The use of the fan is to uniformly distribute the grain on the plane, down which it passes to another inclined plane of equal width set at an angle with the lower edge of the first. The second plane reaches nearly to the ground, thus preventing the grain from being scattered by the wind and insuring an even distribution on the soil.

In order to enable others skilled in the art to which our invention appertains to make and use the same, we will now proceed to describe its construction and operation, referring to the accompanying drawings.

Figure 3:
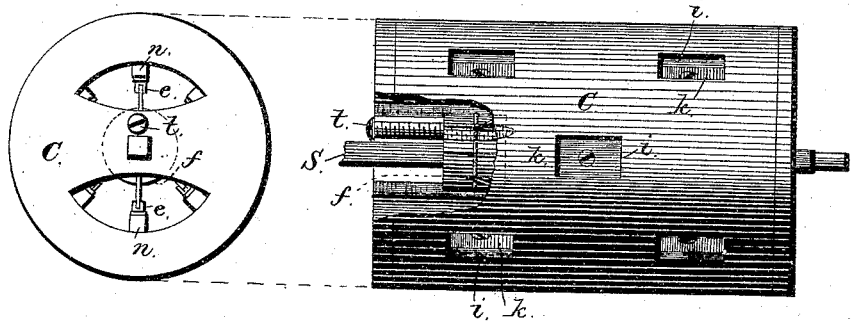
Figure 4:
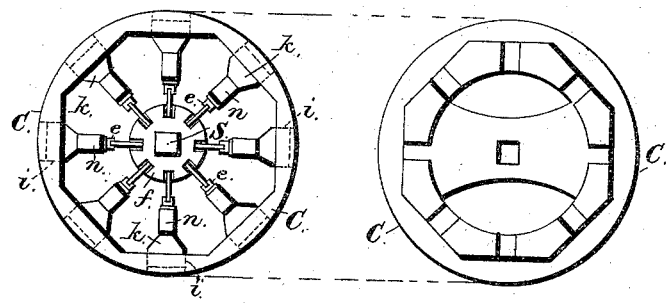
Figure 5:
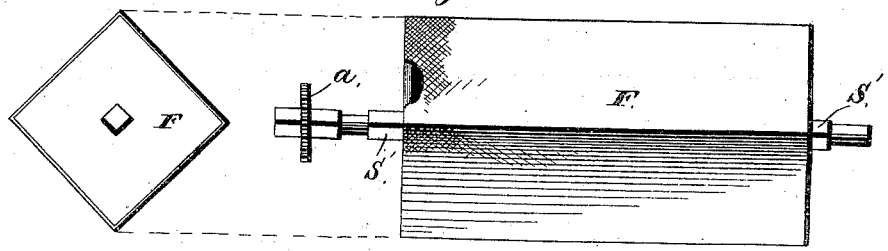
Figure 6:
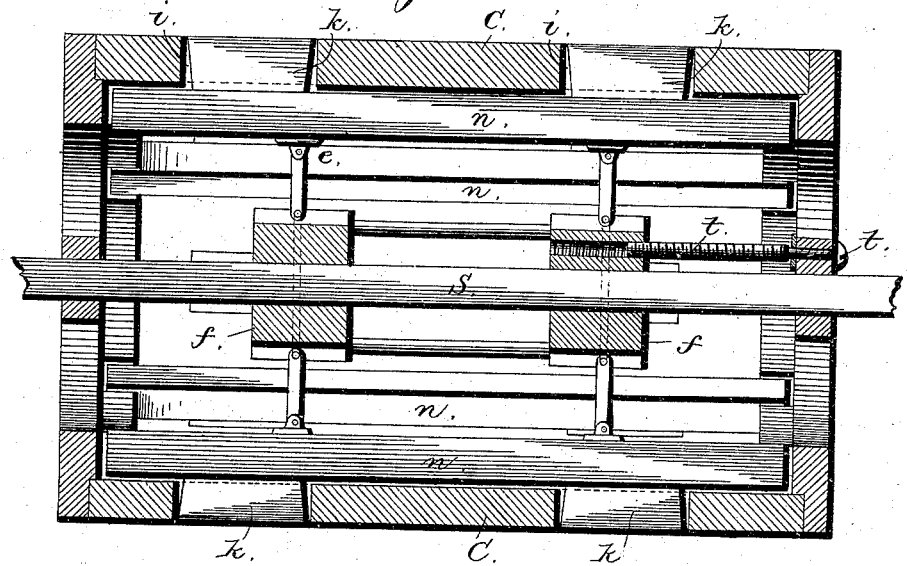
Figure 7:
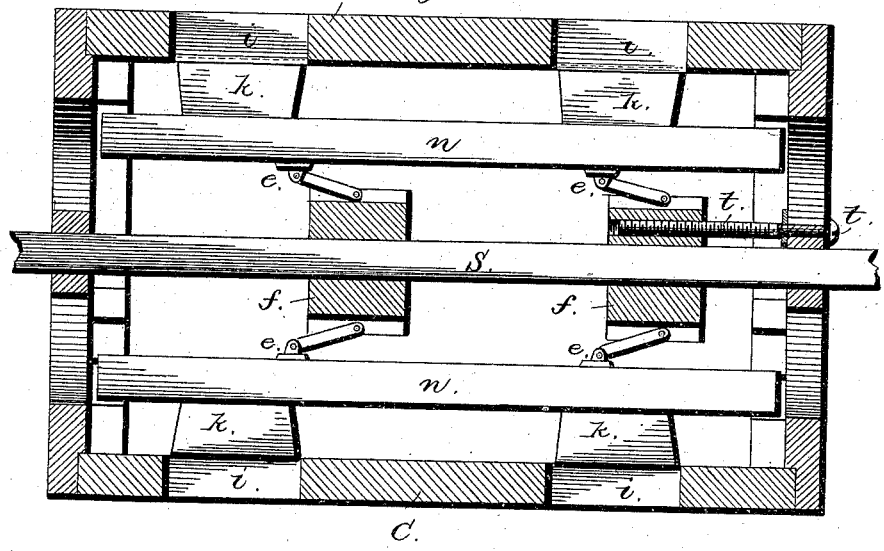

Figure 1 is a rear elevation; Fig. 2, a side view showing the gearing by which the cylinder and fan are operated. Fig. 3 shows side and end views of cylinder in which set-screw is placed. Fig. 4 shows end of cylinder on which cog-wheel is placed, cap of cylinder being first removed, so as to show heads that slide on cylinder-shaft inside, also knees that support lateral bars. Fig. 5 shows revolving fan with cog-wheel for chain-belt on end of shaft. Fig. 6 represents a longitudinal section of the cylinder C, showing the inside gearing, the knees $e$ perpendicular, the heads $f$ on the shaft S drawn up by the set-screw $t$, and the tops of the movable bottoms $k$ flush with the surface of the cylinder. Fig. 7 represents a longitudinal section of the cylinder, showing the position of the knees $e$ and heads $f$ when the tops of the movable bottoms $k$ are lowered to the bottom of the cups $i$; also showing shaft and inside gearing. Fig. 8 represents a transverse section of the square fan F, with the inclined planes P and P', and showing the direction of the grain after it falls on the square fan F.

The machine is mounted upon a single axle, A, carried by ordinary cast-hub wheels with iron or wooden spokes W W'. The tongue Y is fastened to the center of the first and second bottom cross-pieces of the frame.

The box containing the cylinder and fan (represented by B B') is composed of two parts—the part B' to be removed at pleasure, exposing the cylinder and fan F. The hopper H covers the upper portion of the cylinder which carries the grain down to the square fan below.

L is the lever by which the ratchet R on cylinder-shaft S is moved. When the ratchet is shoved out to the inside of the cog-wheel $m$ on the end of the cylinder-shaft, it is caught by the teeth of ratchet R', thus causing the cylinder to revolve. When ratchet R is disjoined from ratchet R', the cylinder remains stationary. The shaft of the fan is represented by S', and on one end is fastened a small chain-belt cog-wheel, $a$, by which the fan is turned.

On the inside of the carriage-wheel W' is fastened a chain-belt or cog wheel, $b$, and on the end of the cylinder-shaft S is a large chain-belt or cog wheel, $m$. The chain-belt D passes over the wheels $b$ and $m$, and under cog-wheel $a$, causing the cylinder to turn toward the front and the fan in the opposite direction. The grain, when put into the hopper H, fills the cups $i$ in the face of the cylinder, and to prevent any grain from leaving the hopper, except what is contained in the cups, a slide, $x$, with a rubber edge at the bottom, is set down close to the face of the cylinder. The cylinder is of the required diameter. The cups in the cylinder are formed by cutting holes in the face thereof, in which holes are placed movable bottoms $k$, lowered and raised by means of a set-screw, $t$, in the end of the cylinder. This set-screw moves heads $f$ on the cylinder-shaft S. From these heads knees $e$ reach to the bars $n$, extending the whole length of the cylinder. To the top of these bars the movable bottoms of the cups are fixed, and as the set-screw moves the heads $f$ laterally on the cylinder-shaft the bars $n$ are raised or lowered, thus regulating the depth of the cups, and therein the quantity of grain sowed in moving over a given space. The face of the cylinder may have fourteen (more or less) rows of cups, and eleven (more or less) cups in each row, each cup being of any desired dimension. The fan is the same length of the cylinder, and is covered with canvas, its use being to cause an even distribution of the grain, and it is placed nearly under the cylinder. It catches the grain and throws it back onto an inclined plane or scatterer, P, down which it passes to another inclined plane or scatterer, P', which is placed at an angle to the first one. The lower edge of the plane P' reaches nearly to the ground, thus preventing the wind from scattering the grain. The lever L is attached at $o$ when the driver rides, and at $z$ when he walks behind the seeder. The lever is a double spring-bar, the purpose of the lower spring, $v$, being to allow the ratchet to slide in backing and turning the machine. The upper spring, $r$, is to hold the lever in its place in the catch $w$ and $w'$.

Having thus fully described our invention, what we claim as new, and desire to secure by Letters Patent, is—

1. In a seeding-machine, the cylinder C, provided with shaft S, on which are adjustably mounted heads $f$, connected with bars $n$ by knees $e$, for graduating the orifices $i$ in the cylinder, substantially as shown and described.

2. In a seeding-machine, the cylinder C, shaft S, adjustable heads $f$, knees $e$, bars $n$, and blocks $k$, in combination with the fan F and inclined scatterers P P', substantially as shown and described.

3. In a seeding-machine, the hopper H, cylinder C, shaft S, heads $f$, knees $e$, bars $n$, and blocks $k$, in combination with the scatterers P P', substantially as shown and described.

In testimony of the foregoing claims and specification set forth by us we have hereunto set our hands this 23d day of May, 1885.

DANIEL W. WEBSTER.
RUBEN J. SMITH.

Witnesses:
C. W. WHITE,
A. K. RALPH.